United States Patent
Russo

(10) Patent No.: US 11,685,353 B2
(45) Date of Patent: Jun. 27, 2023

(54) SYSTEMS AND METHOD FOR SECUREMENT OF A CONTAINER TO A VEHICLE HAVING A BRAKE SYSTEM

(71) Applicant: Mi-Jack Products, Inc., Hazel Crest, IL (US)

(72) Inventor: James T. Russo, Chicago Heights, IL (US)

(73) Assignee: MI-JACK PRODUCTS, INC., Hazel Crest, IL (US)

( * ) Notice: Subject to any disclaimer, the term of this patent is extended or adjusted under 35 U.S.C. 154(b) by 108 days.

(21) Appl. No.: 17/141,967

(22) Filed: Jan. 5, 2021

(65) Prior Publication Data

US 2022/0212643 A1   Jul. 7, 2022

(51) Int. Cl.
    *B60T 13/26* (2006.01)
    *B60T 15/50* (2006.01)
    *B60T 17/06* (2006.01)

(52) U.S. Cl.
    CPC ............ *B60T 13/268* (2013.01); *B60T 15/50* (2013.01); *B60T 17/06* (2013.01)

(58) Field of Classification Search
    CPC ........ B60T 13/268; B60T 15/50; B60T 17/06; B62D 53/067
    USPC .......................................................... 303/85
    See application file for complete search history.

(56) References Cited

U.S. PATENT DOCUMENTS

| | | |
|---|---|---|
| 1,988,942 A | 1/1935 | Fildes |
| 2,424,429 A | 7/1947 | Bamberg |
| 3,158,106 A | 11/1964 | Clejan |
| 3,331,333 A | 7/1967 | Coulson |
| 3,399,921 A | 9/1968 | Trost et al. |
| 3,614,153 A | 10/1971 | Tantlinger et al. |
| 3,667,401 A | 6/1972 | Schwiebert et al. |
| 3,719,385 A | 3/1973 | Carr |
| 4,047,748 A | 9/1977 | Whaley et al. |
| 4,212,251 A | 7/1980 | DiMartino |
| 4,236,858 A | 12/1980 | Hoese et al. |
| 4,266,820 A | 5/1981 | Whaley et al. |
| 4,382,734 A | 5/1983 | Synowiec et al. |
| 4,437,211 A | 3/1984 | Dorpmund |
| 5,106,247 A | 4/1992 | Hove et al. |
| 5,120,243 A | 6/1992 | Mee |
| 5,465,990 A * | 11/1995 | Wessels ............... B62D 53/068 180/209 |
| 5,564,725 A | 10/1996 | Brazeal |
| 5,573,360 A | 11/1996 | Bennett |
| 5,575,599 A | 11/1996 | Conlee et al. |
| 5,758,890 A * | 6/1998 | Wessels ............... B62D 53/067 410/91 |

(Continued)

FOREIGN PATENT DOCUMENTS

| | | |
|---|---|---|
| EP | 1 243 466 A2 | 9/2002 |
| EP | 2 308 719 A1 | 4/2011 |

(Continued)

*Primary Examiner* — Nicholas J Lane
*Assistant Examiner* — San M Aung
(74) *Attorney, Agent, or Firm* — McCracken & Gillen LLC

(57) ABSTRACT

A system for a vehicle having a brake system comprises a retention device adapted to engage and secure a container to the vehicle responsive to operation of the brake system. A method of a system for a vehicle having a brake system adapted to engage and secure a container to the vehicle responsive to operation of the brake system is also disclosed.

17 Claims, 19 Drawing Sheets

(56) References Cited

U.S. PATENT DOCUMENTS

| | | |
|---|---|---|
| 5,829,946 A | 11/1998 | McNeilus et al. |
| 5,839,864 A | 11/1998 | Reynard |
| 5,848,869 A * | 12/1998 | Slocum ................ B60P 1/6454 414/500 |
| 6,409,192 B1 | 6/2002 | Botts |
| 6,565,299 B1 | 5/2003 | Guilbault et al. |
| 6,692,203 B2 | 2/2004 | Kim et al. |
| 7,240,936 B2 | 7/2007 | Petzitillo, Jr. et al. |
| 7,484,918 B2 | 2/2009 | Brewster |
| 7,984,941 B2 | 7/2011 | Lorenzo et al. |
| 8,348,564 B2 | 1/2013 | Fukui |
| 9,340,146 B2 | 5/2016 | Lanigan, Sr. et al. |
| 9,387,792 B2 | 7/2016 | Lanigan, Sr. et al. |
| 9,463,732 B2 | 10/2016 | Lanigan, Sr. et al. |
| 9,802,526 B2 | 10/2017 | Lanigan, Sr. et al. |
| 2007/0292228 A1 | 12/2007 | Watson |
| 2008/0014040 A1 | 1/2008 | Ding |
| 2010/0303573 A1 | 12/2010 | Brewster |
| 2013/0121783 A1 | 5/2013 | Kelly |
| 2015/0232013 A1* | 8/2015 | Lanigan, Sr. ......... B60P 1/6481 410/69 |

FOREIGN PATENT DOCUMENTS

| | | |
|---|---|---|
| WO | WO 2008/095605 A1 | 8/2008 |
| WO | WO 2011/066829 A1 | 6/2011 |

* cited by examiner

SYSTEMS AND METHOD FOR SECUREMENT OF A CONTAINER TO A VEHICLE HAVING A BRAKE SYSTEM

CROSS REFERENCE TO RELATED APPLICATIONS

This patent application incorporates by reference co-owned U.S. Pat. Nos. 9,387,792, 9,463,732, and 9,802,526, each entitled "Latching System for Automatic Securement of a Container to a Container Chassis" by John J. Lanigan, Sr., et al., co-owned U.S. Pat. No. 9,340,146, entitled "Front Pin Latching System for Automatic Securement of a Container to a Container Chassis" by John J. Lanigan, Sr., et al., and co-owned U.S. patent application Ser. No. 17/141,904, entitled "Latching Device and Method for Automatic Securement of a Container to a Container Chassis" by James T. Russo et al.

BACKGROUND OF THE DISCLOSURE

1. Field of the Disclosure

The present subject matter relates generally to securement systems and methods, and more particularly, to systems and methods for securement of a container to a vehicle having a brake system.

2. Description of the Background of the Disclosure

In a conventional container chassis used for transporting a container, the container is secured to the container chassis by two latches spaced apart at each of the two front corners and two latches spaced apart at each of the two rear corners of the container chassis. In one design these latches are manually operated by the driver or other personnel. The rear latches may have a twist lock that is inserted into the bottom of the corner castings of a container. The twist lock may be operated by a lever to move the twist lock between an unlatched position and a latched position. The front latches of a conventional chassis that is 40 to 53 feet in length may have locking pins that extend horizontally into openings of the corner castings of the container. The front of a conventional chassis that is 20 feet in length may utilize a twist lock and manual lever rather than the locking pins.

Such conventional latching devices are manually operated by the chassis driver or other personnel when a container is placed on a chassis. Subsequently, the conventional latching devices are manually unlocked before the container is removed from the chassis. In this regard, the driver or other personnel may improperly or incompletely lock or unlock the latching devices, which may cause improper loading/unloading of the container to/from the chassis and/or create the potential for shifting of or losing a container during road transport.

In the railway transportation industry, a container is typically secured to the four corners of a railcar using a swing-type latch. Two swing-type latches spaced apart at each of the two front corners and two swing-type latches spaced apart at each of the two rear corners of the railcar secure the container thereto. Similar to the twist lock latch of a container chassis, the swing-type latches of the railcar enter openings along the bottom surface of each corner casting of the container. Unlike the twist lock latch, the swing-type latch is continuously biased into position by a spring. As the container is placed on the railcar, the latch is pushed back against the spring until the latch clears the bottom surface of the corner casting. The latch is designed such that a significant force must be applied against the latch to remove the container from the railcar. A container weight of approximately 700 lbs. may be required to load the container onto the railcar, and a force of approximately 2,000 lbs., for example, may be necessary to remove the container from the railcar.

Co-owned U.S. Pat. No. 9,340,146 incorporated by reference herein discloses a front pin latching system for automatic securement of a container to a container chassis. The front pin latching system includes a shelf configured to move vertically on an outer surface of the container chassis. The shelf and the container chassis have adjacent openings. The system also includes a pin configured to move horizontally through the adjacent openings and a linkage mechanism disposed on an inner surface of the container chassis. The linkage mechanism is operably coupled to the shelf and the pin. Placement of the container on the container chassis moves the shelf causing the linkage mechanism to move the pin such that the pin automatically secures the container to the container chassis.

Co-owned U.S. Pat. No. 9,387,792 incorporated by reference herein discloses a latching system for automatic securement of a container to a container chassis. The latching system includes an actuation device disposed on an upper surface of the container chassis, a linkage mechanism disposed below the upper surface, and a connector positioned on a further surface elevated above the upper surface. Placement of the container on the container chassis actuates the actuation device causing the linkage mechanism to move the connector and automatically secure the container to the container chassis.

Co-owned U.S. Pat. No. 9,463,732 incorporated by reference herein discloses a latching system for automatic securement of a container to a container chassis. The latching system includes an actuation device that extends through a surface of the container chassis, a linkage mechanism disposed below the surface, and a latch coupled to a pivot. The latch is positioned above the surface of the container chassis. Placement of the container on the container chassis actuates the actuation device causing the linkage mechanism to move the latch such that the latch automatically secures the container to the container chassis.

SUMMARY

According to one aspect, a system for a vehicle having a brake system comprises a retention device adapted to engage and secure a container to the vehicle responsive to operation of the brake system.

According to another aspect, a system for a vehicle having a brake system comprises a retention device adapted to engage and secure a container to the vehicle responsive to operation of the brake system, wherein the retention device comprises a housing, an actuator, a latch, a linkage device having a first link and a second link, and an actuation mechanism comprising a plunger and a spring.

According to yet another aspect, a method undertaken by a vehicle having a brake system comprises coupling a retention device adapted to engage and secure a container to the vehicle responsive to operation of the brake system, wherein the retention device comprises a housing, an actuator, a latch, and an actuation mechanism comprising a plunger and spring, and coupling the brake system to the actuation mechanism. The brake system comprises a first fluid reservoir, an orifice flow control device coupled to the first fluid reservoir via a first supply line, and a second fluid reservoir coupled to the orifice via a second supply line and to the actuation mechanism via a third supply line. Engaging the actuator of the retention device extends the latch into an orifice of the container, and the plunger of the actuation mechanism is extended into the latch of the container retention device.

Other aspects and advantages will become apparent upon consideration of the following detailed description and the attached drawings wherein like numerals designate like structures throughout the specification.

DETAILED DESCRIPTION

Figure 1:
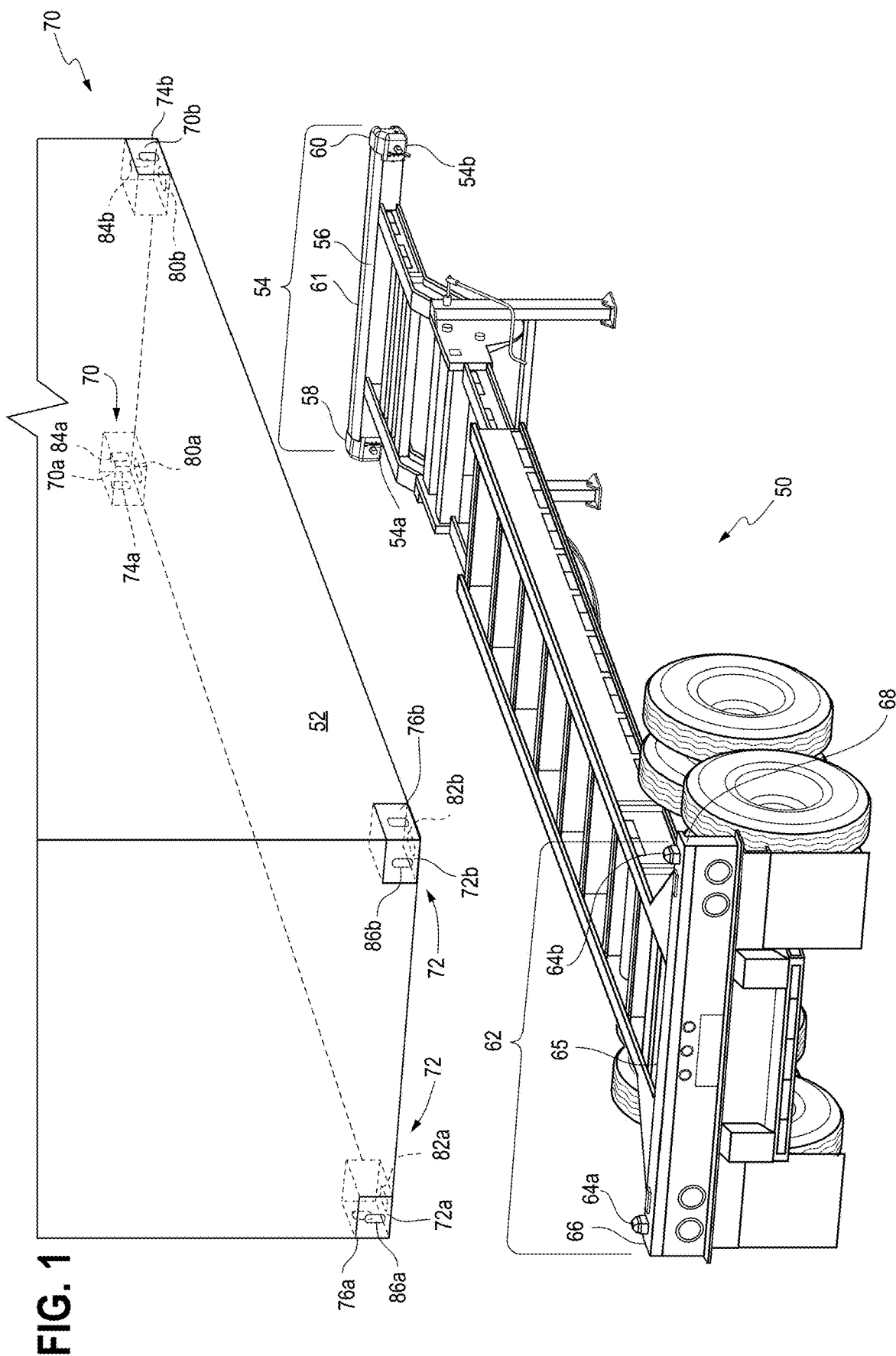
FIG. 1 is an isometric view of a container chassis incorporating container retention devices operative to secure a container thereto.

Various latching devices for use with a container chassis are described herein. As seen, such devices allow for the automatic latching and unlatching of an empty, filled, or partially filled container to and from a container chassis. Furthermore, such devices in combination with a fluid system, such as a braking system, may allow for the automatic latching/locking and unlatching/unlocking of an empty, filled, or partially filled container to and from a container chassis. In the drawings, like reference numerals connote like structures throughout.

Figure 2:
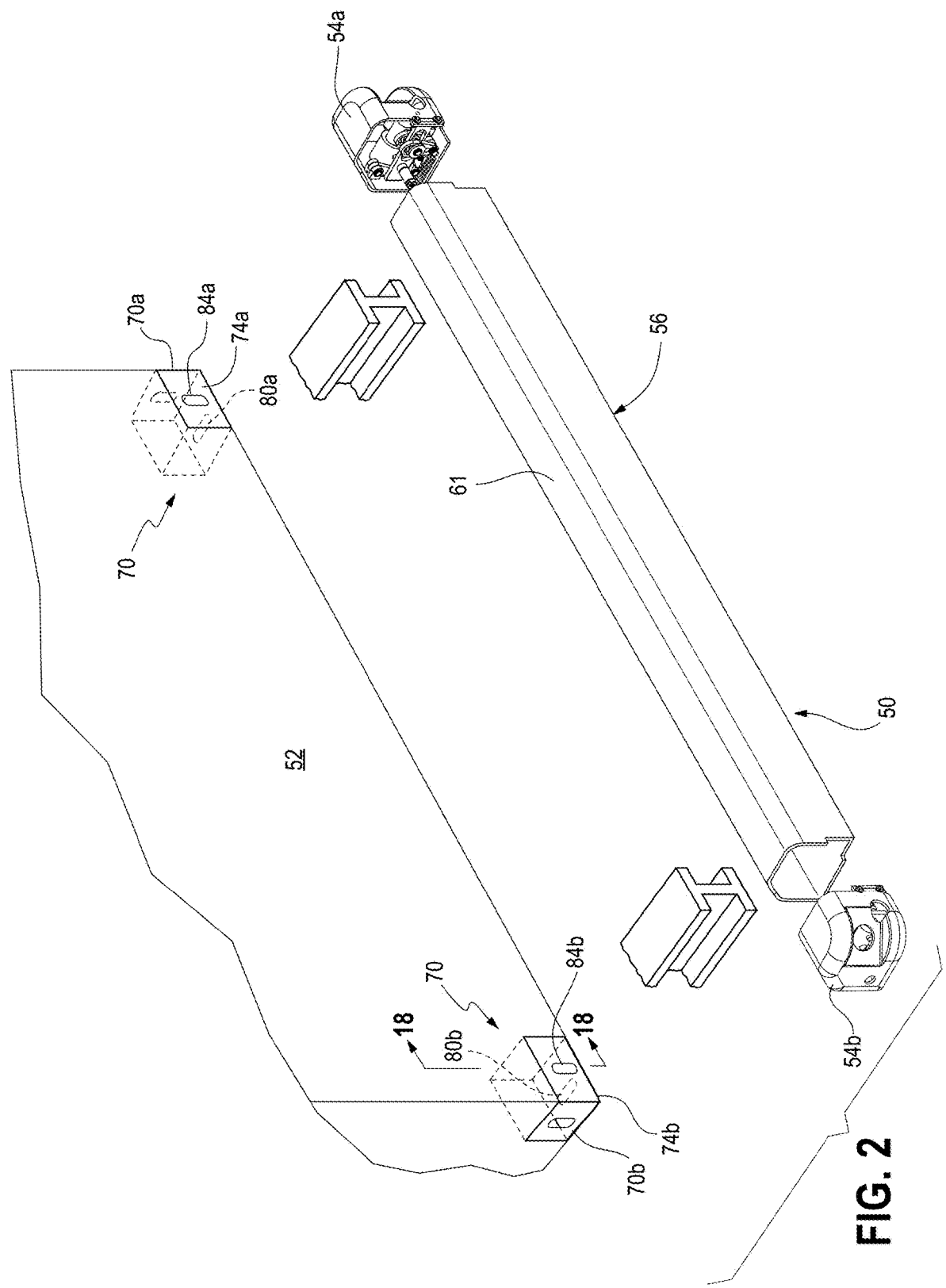
FIGS. 2 and 3 are exploded, fragmentary, isometric front and rear views, respectively, of the front container retention devices of FIG. 1 and the container.
Figure 3:
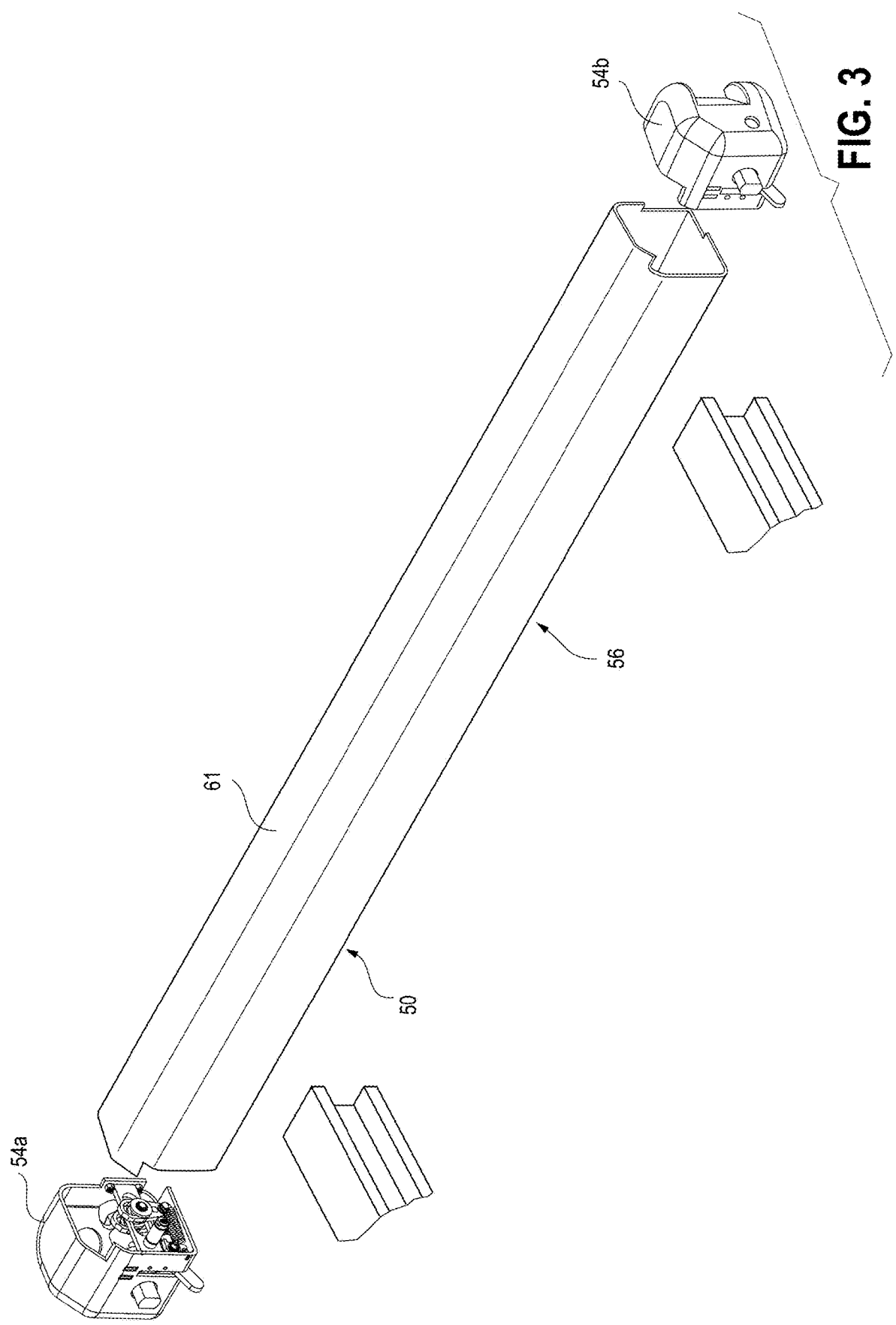

Referring to FIGS. 1-3, a container chassis 50 includes container latching devices to secure a container 52 thereto. More particularly, a pair of front latching structures 54 comprising spaced first or driver side and second or passenger side front container retention devices 54a, 54b, respectively, is disposed at a front portion 56 of the chassis 50, preferably at or adjacent associated front corners 58, 60 of the chassis 50. Particularly, in the illustrated embodiment, the devices 54a, 54b are integral with or secured (such as by welds) to outboard ends of a transverse head beam 61 of the chassis 50. Alternatively, the devices 54a, 54b may be integrated within the outboard ends of a transverse head beam 61 of the chassis 50. A pair of rear latching structures 62 (FIG. 1) comprising spaced first or driver side and second or passenger side rear container retention devices 64a, 64b, respectively, is provided on a rear portion 65 of the chassis 50, preferably at or adjacent associated rear corners 66, 68 of the chassis 50. As seen in FIGS. 1 and 2, the container 52 includes front and rear pairs of castings 70, 72, respectively, wherein the front pair 70 comprises a first or driver side front casting 70a and a second or passenger side front casting 70b. The rear pair 72 comprises a first or driver side rear casting 72a and a second or passenger side rear casting 72b. The castings 70a, 70b, 72a, 72b are preferably disposed at or adjacent front and rear corners 74a, 74b, 76a, 76b, respectively, of the container 52.

Each of the castings 70a, 70b, 72a, 72b may include a first or bottom opening 80a, 80b, 82a, 82b, respectively. In addition, each of the castings 70a, 70b may include forward-facing openings 84a, 84b while each of the castings 72a, 72b may include rearwardly-facing openings 86a, 86b, respectively. Each of the castings 70, 72 may include a lesser or greater number of openings, for example, openings may be provided on side surfaces thereof or the front castings 70a, 70b may include only the forward facing openings 84a, 84b, respectively. In any event, each casting 70, 72 has at least a necessary number of properly-positioned openings such that, when the container 52 is disposed on the chassis 50, one or more portions of the container retention devices 54a, 54b, 64a, 64b extend into one or more of the casting openings 80, 82, 84, and/or 86 to allow securement of the container 52 to the chassis 50 as described hereinafter.

The container chassis 50 shown in the embodiment in FIG. 1 may have a length of 40 to 53 feet, for example. Differently-sized containers may be accommodated on the chassis 50 by providing a greater number of container latching devices and/or castings as required to secure the container 52 in a stable fashion. Still further, a container chassis having a length of 20 feet (not shown) may alternatively utilize the latching arrangements described herein in the rear and/or front portions of the container chassis.

In the embodiment shown in FIGS. 1-3, the front container retention devices 54a, 54b are mirror images of one another, but are preferably otherwise identical, and hence, only the driver side retention device 54a will be described in detail herein.

Figure 4:
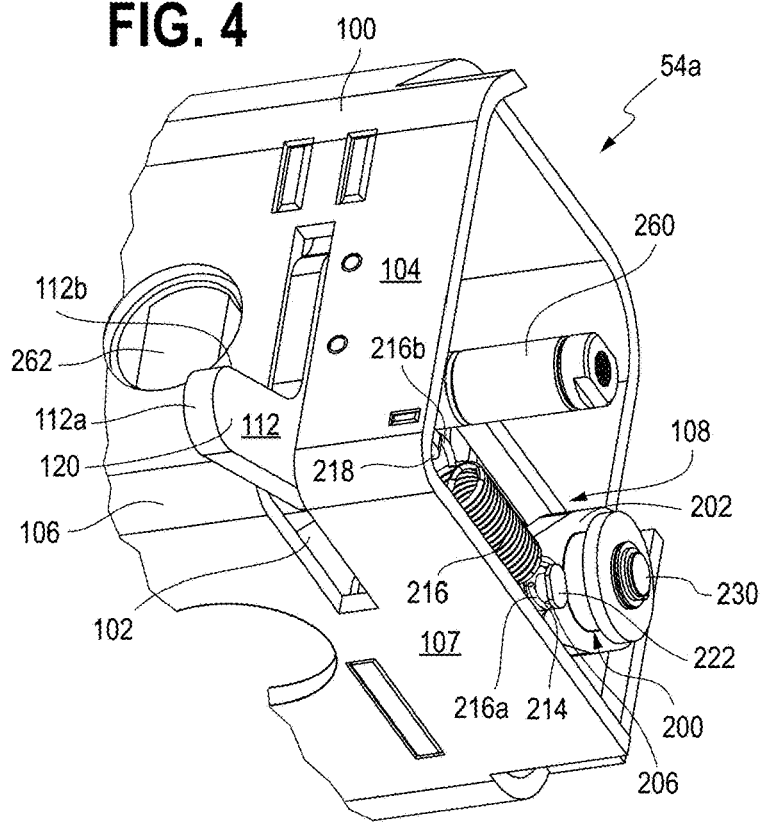
FIGS. 4-6 are bottom rear, top front, and top side fragmentary isometric views, respectively, of one of the container retention devices of FIG. 2 shown in an unlatched state.
Figure 5:
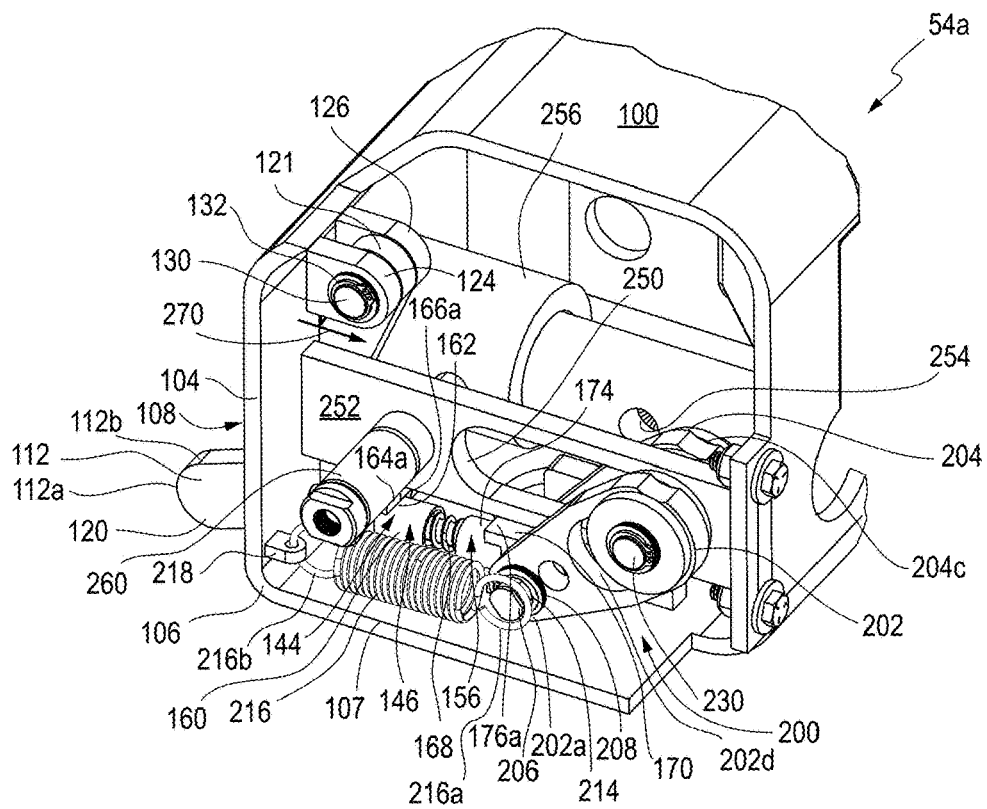
Figure 6:
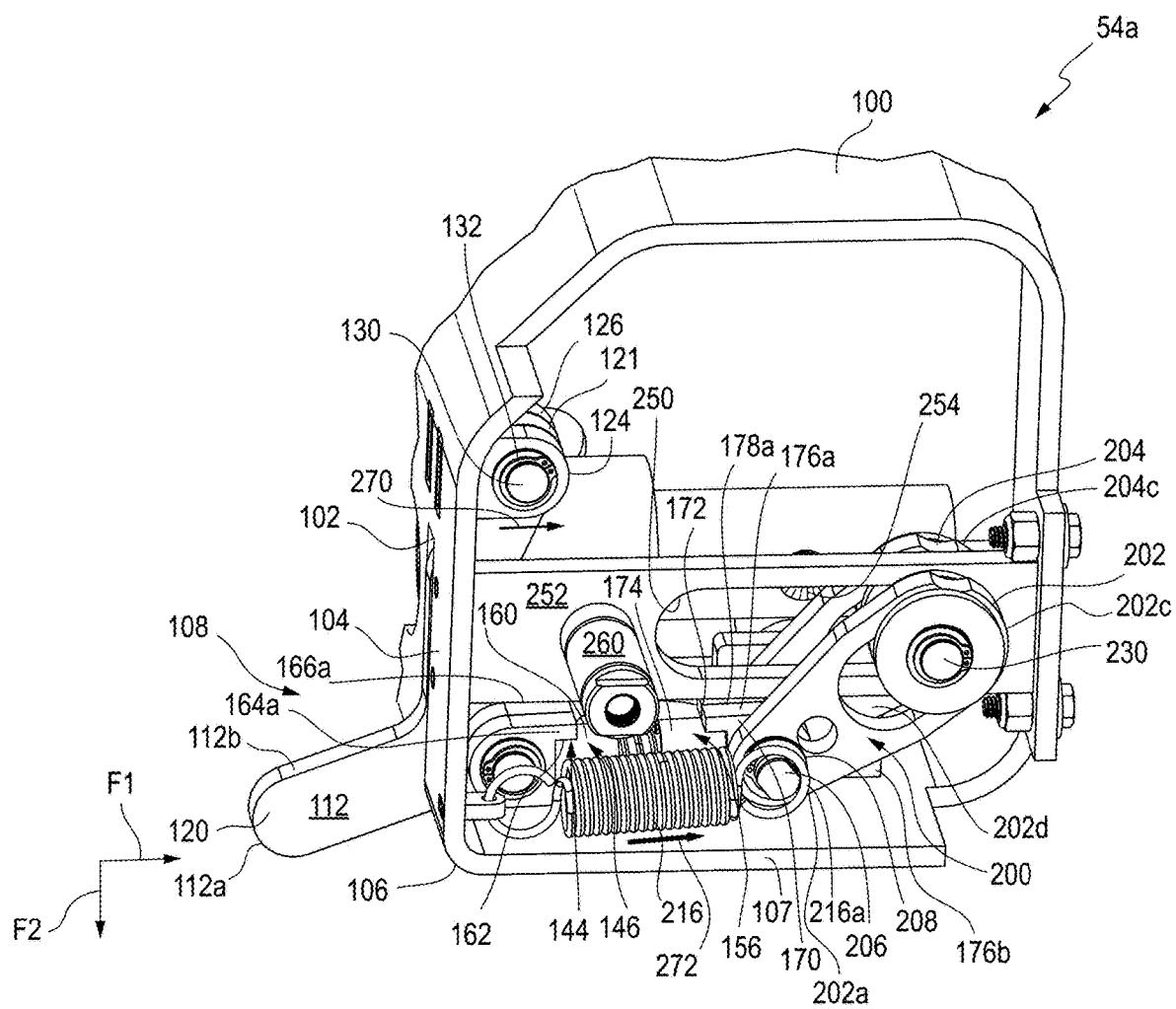

Referring next to FIGS. 4-6, the retention device 54a includes a housing 100 having an elongate slot 102 that extends fully through the housing 100 and further extends linearly from a first wall 104 through a corner 106 to a second wall 107 of the housing 100. The housing 100 encloses a retention mechanism 108 therein.

Figure 12:
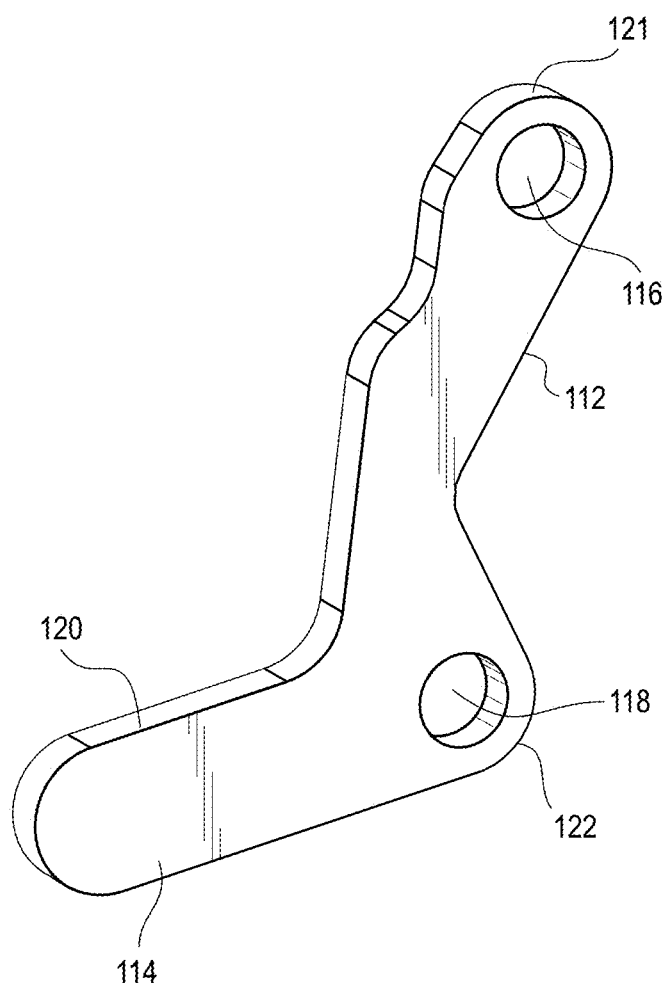
FIG. 12 is an isometric view of the actuator of FIGS. 4-6.
Figure 13:
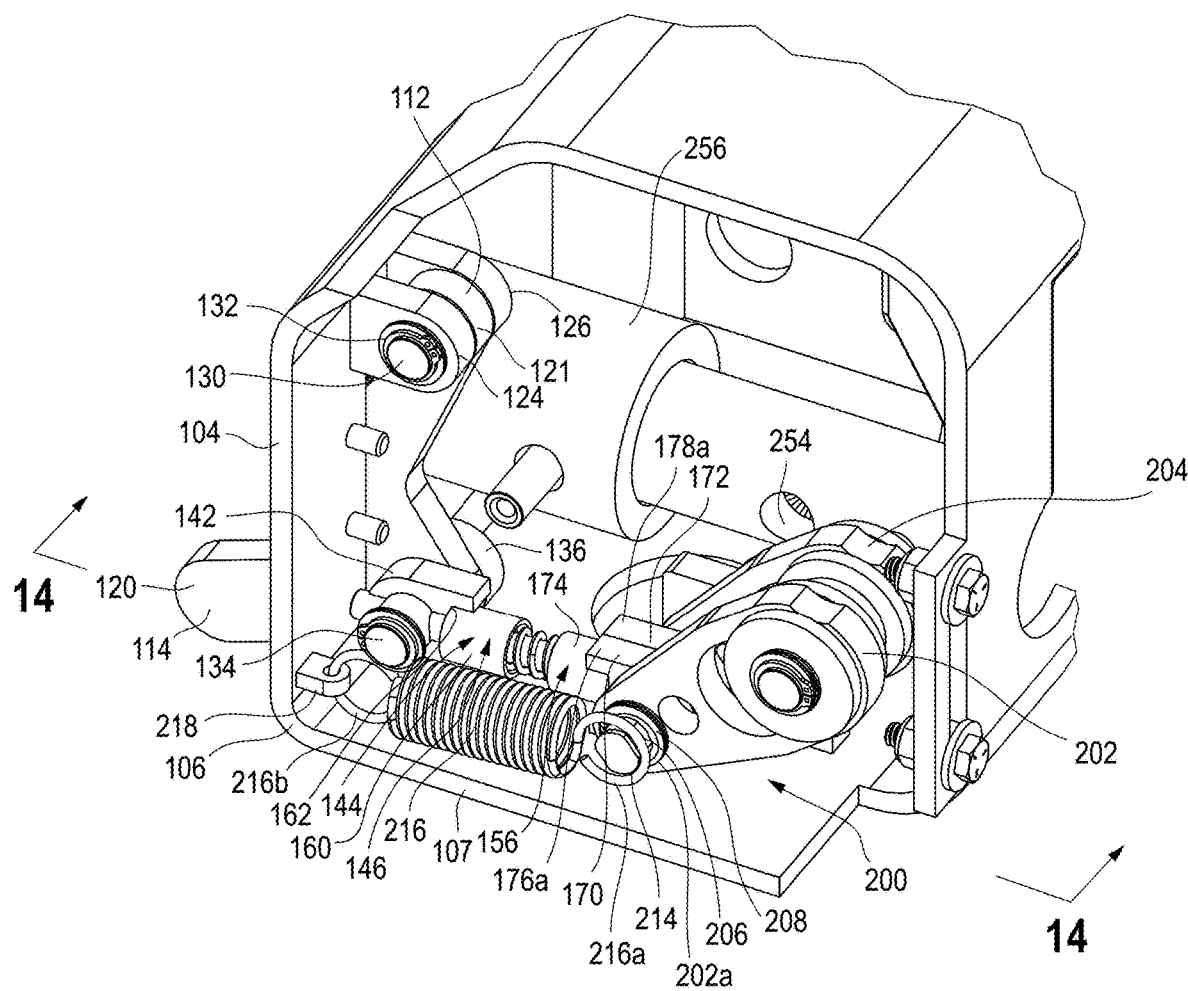
FIG. 13 is a fragmentary isometric view of the container retention device of FIGS. 4-8 with portions removed therefrom to reveal interior components.

The retention mechanism 108 comprises an actuator 120 (seen in detail in FIG. 12) having an approximate L-shape including first and second legs 112, 114, respectively, and first and second openings 116, 118 disposed at an end portion 121 and a heel portion 122, respectively. As best seen in FIGS. 5 and 6, the end portion 121 is disposed between a clevis formed by pair of aligned anchors 124, 126 and is rotatably secured therebetween by a pin 130 and snap or lock ring 132. Referring also to FIGS. 13-17, the second opening 118 (best seen in FIG. 15) receives a pin 134 and a spacer 136 bears against the heel portion 122. The pin 134 extends through aligned cross-openings 138, 139 in first and second link halves 140, 142, respectively, (all best seen in FIGS. 14 and 15) wherein the link halves together define a first portion 144 of a first link assembly 146 (FIGS. 5 and 6) (the link half 140 and other structures are omitted in FIG. 13 to illustrate the internal structures of the portion 144). Opposed snap or lock rings 147a, 147b disposed on ends of the pin 134 rotatably secure the link halves 140, 142 to the spacer 136 and the heel portion 122. A proximal end 148 of a longitudinal cylindrical shaft 149 (FIGS. 14 and 15) is slidably disposed in a cross bore 150 extending through the shaft 137 and extends toward a second portion 156 of the first link assembly 146.

A first tube 160 is disposed in a recess 162 (FIGS. 5, 6, 13, and 14) defined by upper flanges 164a 166a and lower flanges 164b, 166b (FIG. 15) of the link halves 140, 142. The first tube 160 is retained in the recess 162 in any suitable fashion, such as by being captured between the flanges 164 and 166. In a preferred embodiment, the first tube 160 is welded to the flanges 164 and 166. Also, in alternative embodiments, the flanges 164 and 166 are either a single, integral flange, or are welded together and/or together may partially or fully encircle the first tube 160. A first end 167 (FIGS. 14 and 15) of a spring 168 is received in the first tube 160 and surrounds the shaft 149.

The second portion 156 of the first link 146 is substantially a mirror image of the first portion 144 and includes first and second link halves 170, 172 that define the second portion 156 and a second tube 174 disposed and retained in any suitable fashion (such as noted above with respect to the first tube 160) between upper flanges 176a, 178a and lower flanges 176b and 178b of the link halves 170, 172, wherein a second end 180 (FIGS. 14 and 15) of the spring 168 is disposed in the second tube 174 and may be compressed between end surfaces of the tubes 160, 174. Unlike the first portion 144, a distal end 182 of the shaft 149 is immovably secured and retained in a bore 184 defined between the link halves 170, 172.

A second link assembly 200 includes spaced second link assembly arms 202, 204 that are secured together at lower ends 202a, 204a thereof by a pin 206 with a distal end 212 of the second portion 156 of the first link 146 being disposed between and rotatable with respect to the second link assembly arms 202, 204. In the illustrated embodiment, the pin 206 is press fitted and welded to assembly arm 204. A snap or lock ring 208 secures the arms 202, 204 together at a proximal end of the pin 206, wherein the pin 206 includes a groove 214 proximate the assembly arm 202. A return spring 216 includes a first end 216a that is wrapped over the pin 206 inside the groove 214 and a second end 216b of the spring 216 is secured to an anchor tab 218 integral with or secured to the housing 100. In an alternate embodiment, the assembly arm 202 may be omitted and the pin 206 is press fitted and/or welded to assembly arm 204. As in the previous embodiment, the first end 216a of the return spring 216 is wrapped over the pin 206 inside the groove 214 and a second end 216b of the spring 216 is secured to an anchor tab 218. A distal end 212 of the second portion 156 of the first link is rotatable with respect to the second link assembly arm 204.

Figure 14:
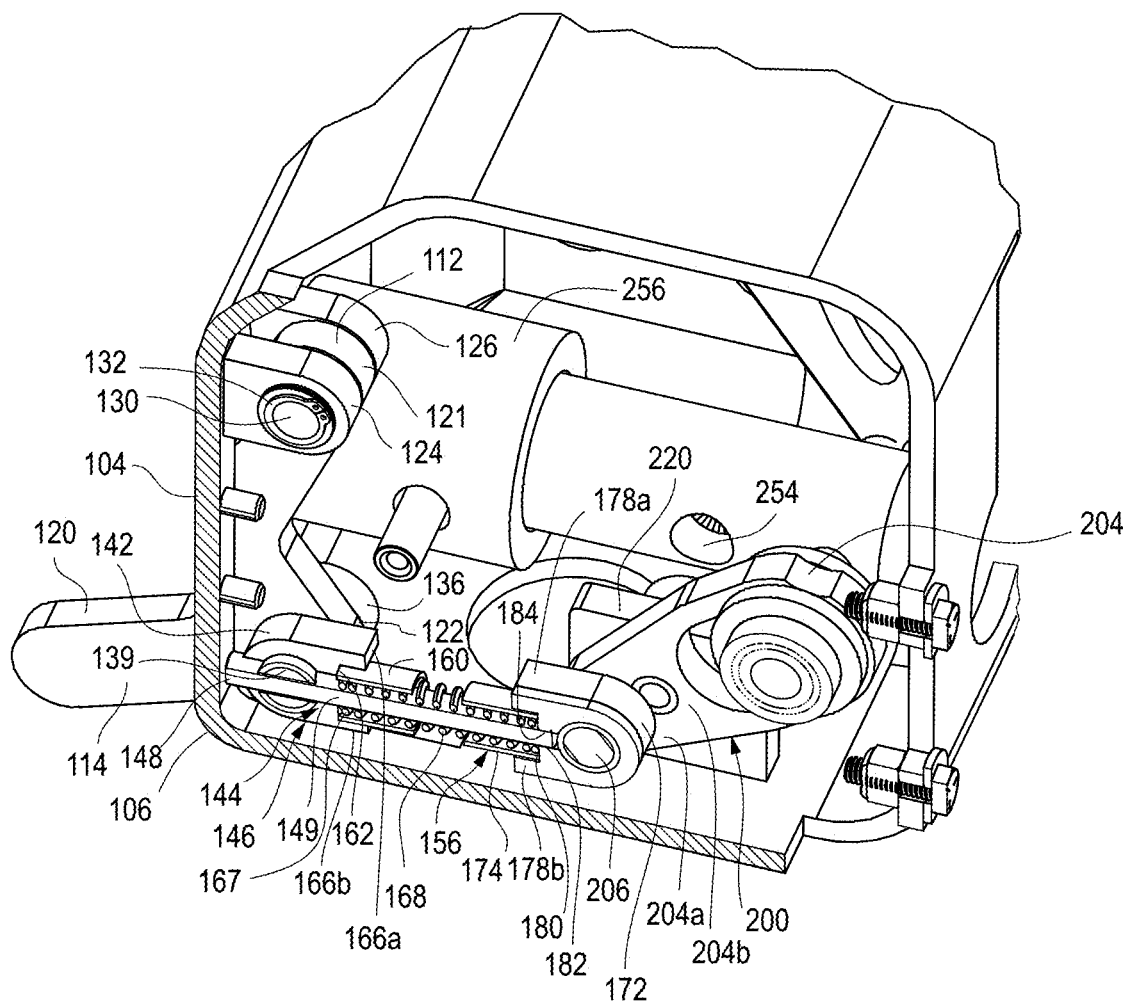
FIG. 14 is a sectional view taken generally along the lines 14-14 of FIG. 13.
Figure 15:
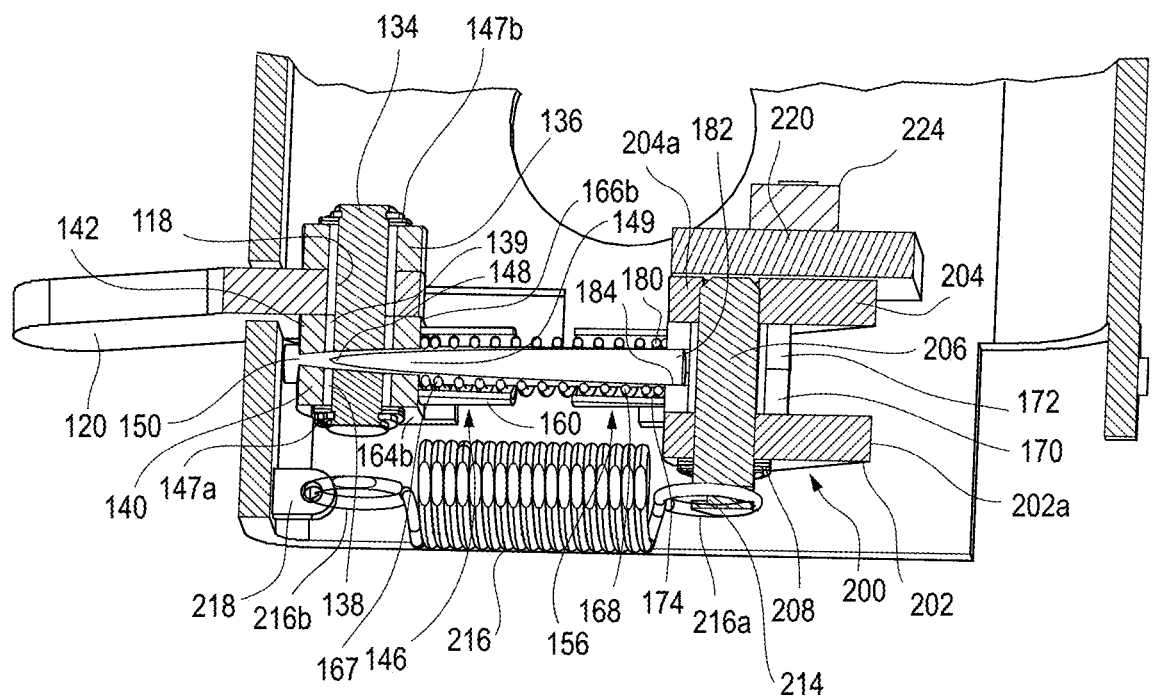
FIG. 15 is a fragmentary sectional view taken generally along the lines 15-15 of FIG. 7 before movement toward the latching position.
Figure 16:
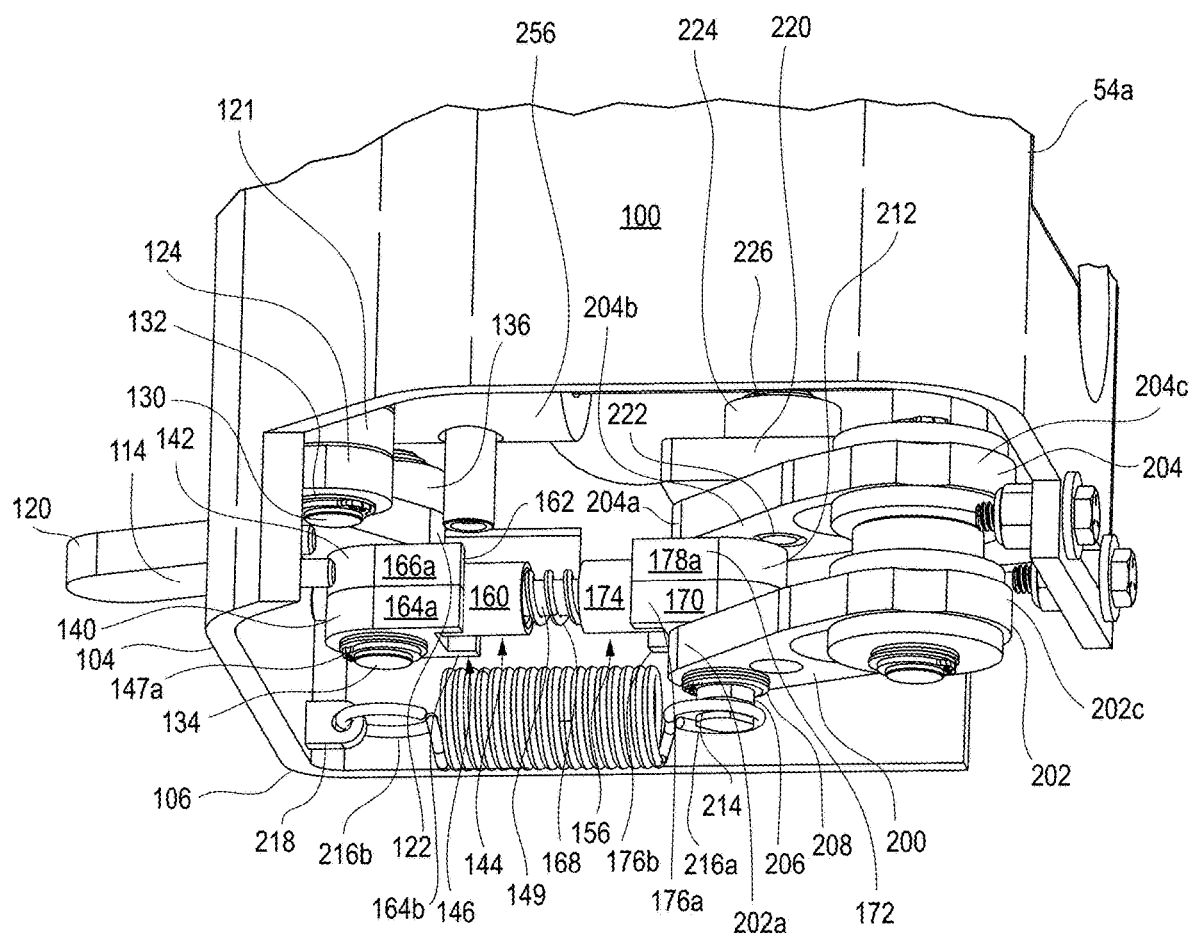
FIG. 16 is a fragmentary isometric view of the container retention device of FIGS. 4-8 with portions removed therefrom to reveal interior components.
Figure 17:
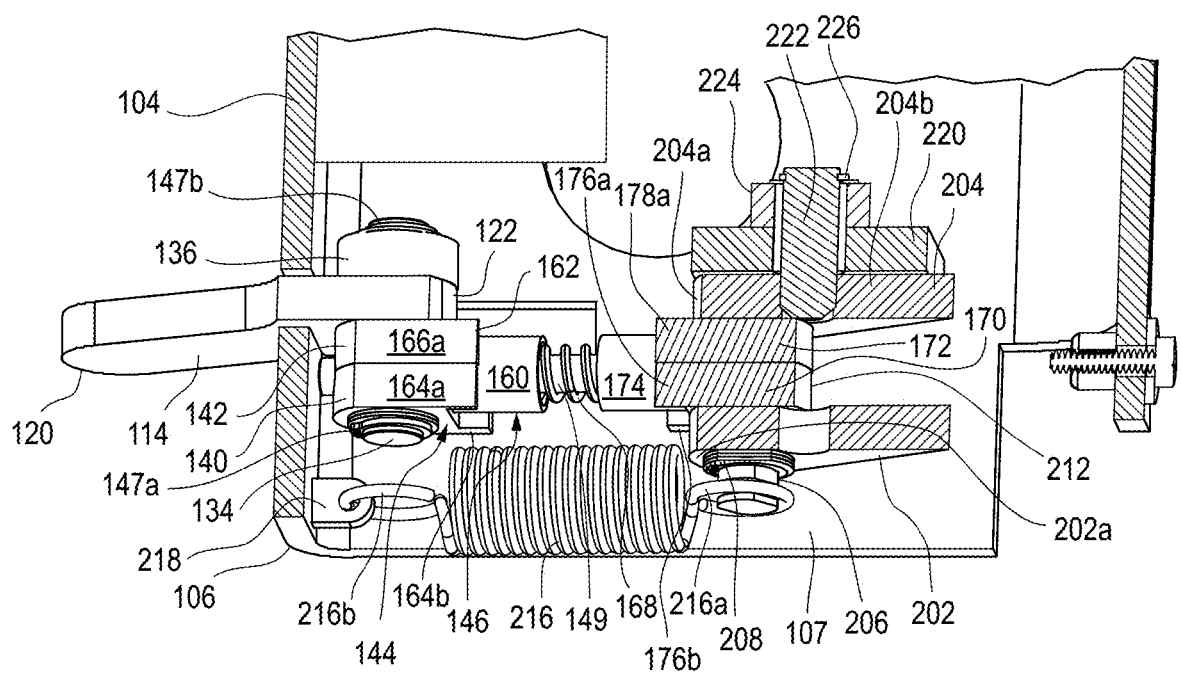
FIG. 17 is a fragmentary sectional view taken generally along the lines 17-17 of FIG. 7 before movement toward the latching position.

As seen in FIGS. 14, 16, and 17, a mid-portion 204b of the link assembly arm 204 is rotatably secured to an anchor plate 220 by a pin 222, a spacer 224, and a snap or lock ring 226. The anchor plate 220 may be integral with or secured to the housing 100 and is stationary with respect to the housing 100. Similar to the pin 206, a proximal end of pin 222 is press fitted within and welded to assembly arm 204, and a distal end of the pin 222 passes through the anchor plate 220 and the spacer 224 and is secured by a snap or lock ring 226.

Figure 9:
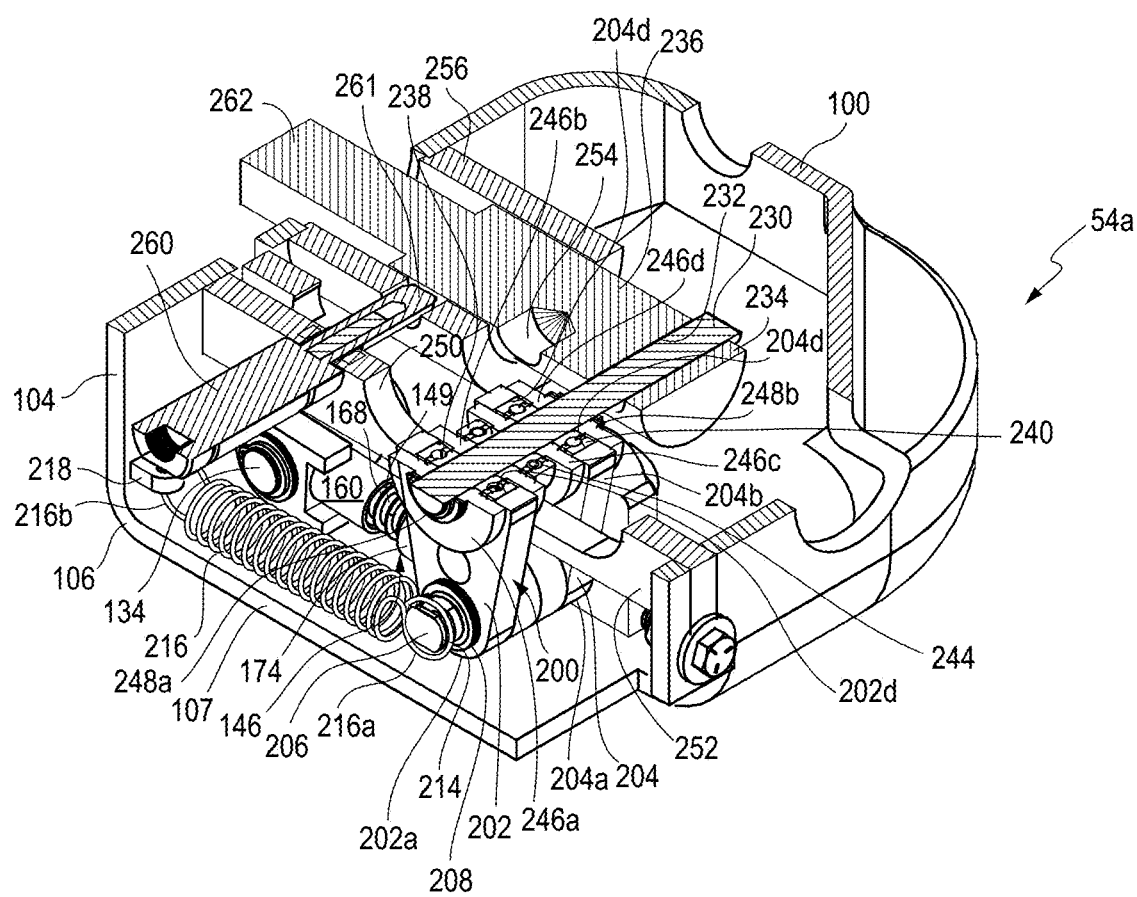
FIGS. 9 and 10 are combined isometric sectional and elevational sectional views taken generally along the lines 9-9 of FIG. 7.
Figure 10:
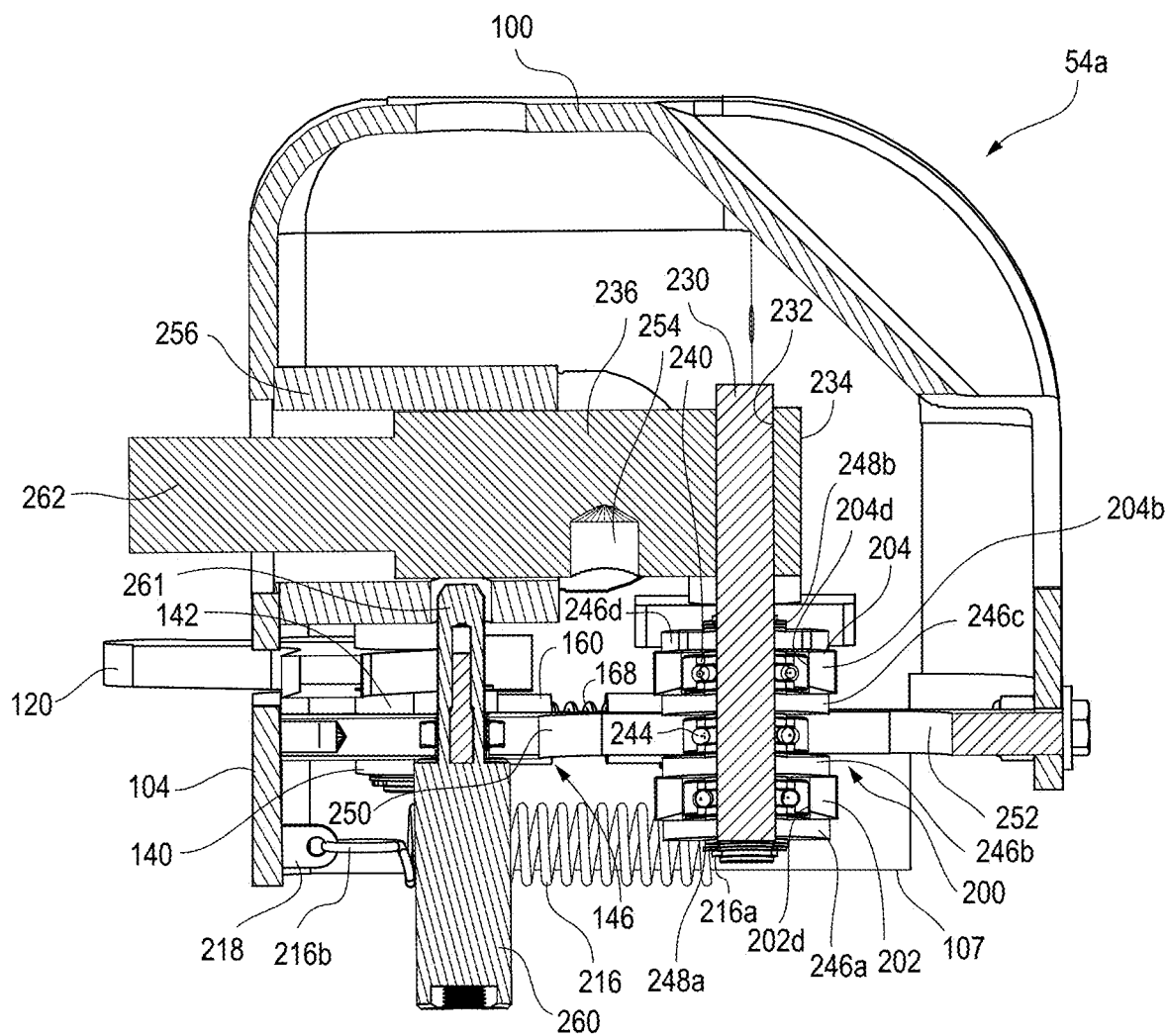

Referring again to FIGS. 5 and 6 (which illustrate the container retention device in an unlatched state) and FIGS. 9 and 10 (which illustrate the container retention device in the process of moving toward a fully latched state), each of upper ends 202c, 204c of the second link assembly arms 202, 204 includes elongate slots 202d, 204d that receive an elongate circular cylindrical shaft 230 that is immovably mounted in a bore 232 FIG. 9) disposed near a first end 234 of a latch 236. First and second bearings sets 238 and 240 are disposed between an outer surface 242 of the shaft 230 and inner surfaces that define the slots 202d, 204d, respectively. The bearings 238 and 240 as well as a further or third set of bearings 244 are held at spaced axial locations on the shaft 230 by spacers 246a-246d and snap or lock rings 248a, 248b. The third set of bearings 244 includes an outer race that contacts and rides on and/or along a racetrack-shaped surface 250 defining a slot of a longitudinal member 252 mounted to opposite front and rear sides of the housing 100.

The latch 236 includes a bore 254 (FIGS. 5, 6, 9, 10, 13, and 14), that may extend partially or fully through the latch 236. A selectively controllable actuation mechanism 260, (FIGS. 4-6, 9, and 10) which may be a hydraulic piston and cylinder device, a solenoid, or another controllable motive power device, includes an actuator plunger 261 (FIGS. 9 and 10) that is movable into and retractable from the bore 254, as noted in greater detail below. The latch 236 further includes a locking member 262 (FIGS. 4, 9, and 10) that may be integral with the balance of the latch or may be secured thereto. The latch 236 and/or locking member 262 extend through a cylindrical collar 256 (FIGS. 9 and 10 as well as other FIGS.) that is joined to or integral with the housing 100 and that provides support for the latch and/or locking member 262.

In operation, before a container 52 is placed on the chassis 50, the various elements of the container retention device 54a are in the positions shown in FIGS. 4-6 and 13-17. Thus, the actuator 120 is disposed in a fully extended position outside of the housing 100. In this state, the return spring 216 exerts a restraining force on the second link assembly 200, which causes the second link assembly 200 to be positioned at an extreme clockwise position (as seen in FIG. 6) about the shaft 230. Such positioning causes the latch 236, and thus the locking member 262, to assume a fully retracted position within the housing.

As seen in FIGS. 1-6, as a container 52 is lowered and/or brought from the rear toward the container retention device 54a, a lower surface or front surface of the container 52 contacts an end surface 112a or a top surface 112b of the leg 112 of the actuator 120, thereby exerting a force on the actuator 120 having a component in a directional range at or between approximate directions represented by force vectors F1 and F2 shown in FIG. 6. Continued advancement of the container 52 in such manner causes the actuator 120 to pivot downwardly and inwardly relative to the housing 100 in the direction of an arrow 270 (FIGS. 5 and 6) about the pin 130. The shape of the actuator 120 and the rotatable connection of the actuator 120 with the first portion 144 via the pin 134 results in translation of the first portion 144 along a path shown by the arrow 272 of FIG. 6 that is substantially parallel to a path traversed by the actuator 120.

Movement of the first portion 144 along the path illustrated by the arrow 272 causes forces to be transferred to the second portion 156 of the first link assembly 146. In this regard, the spring 168 is sufficiently stiff to transmit forces effectively to the second portion 156 to move the latter in the direction of the arrow 272 when the latch 236 and locking member 262 are free to extend. On the other hand, the spring 168 is sufficiently compliant to compress and take up motion and limit forces transmitted to the second portion 156 when the latch 236 and locking member 262 are unable to move in the extension direction as a result of, for example, misalignment of the locking member 262 relative to the front opening 84a of the casting 72a resulting in blocking of the locking member 262. In this regard, the longitudinal shaft 149 prevents the spring 168 from winding up on itself when the latter is compressed.

Figure 7:
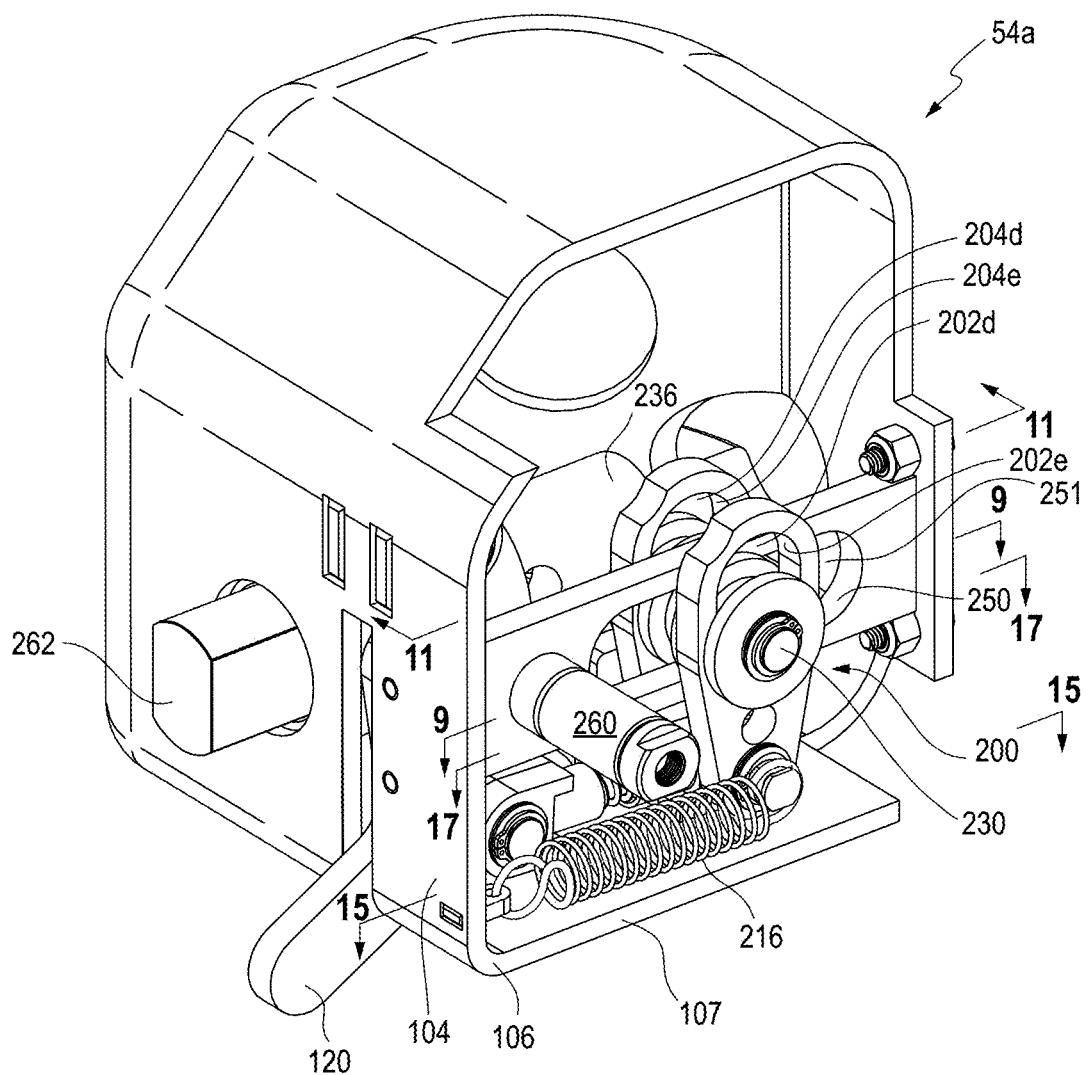
FIGS. 7 and 8 are top rear and top side isometric views, respectively, of one of the container retention devices of FIG. 2 shown in a latching state.
Figure 8:
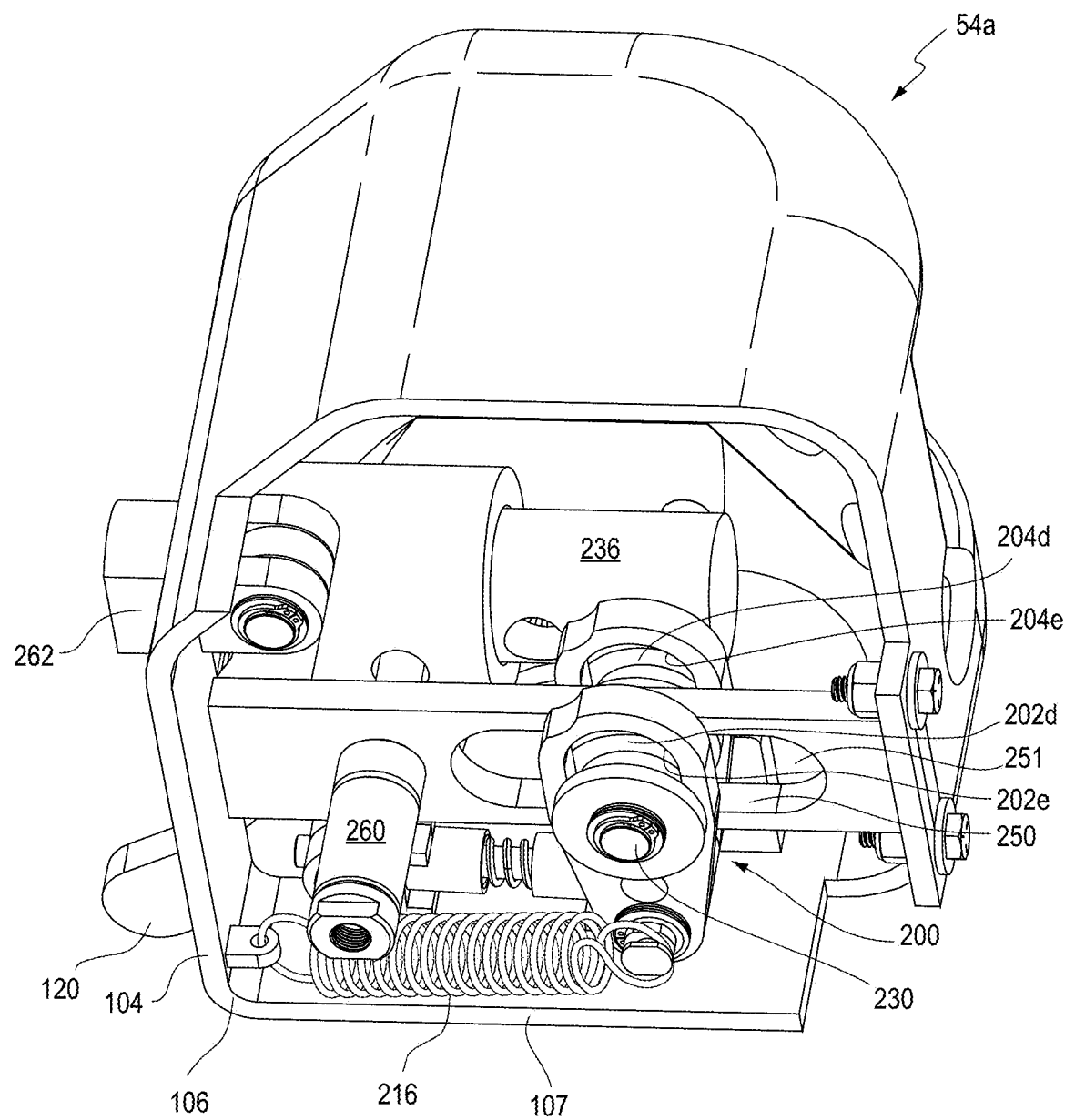
Figure 11:
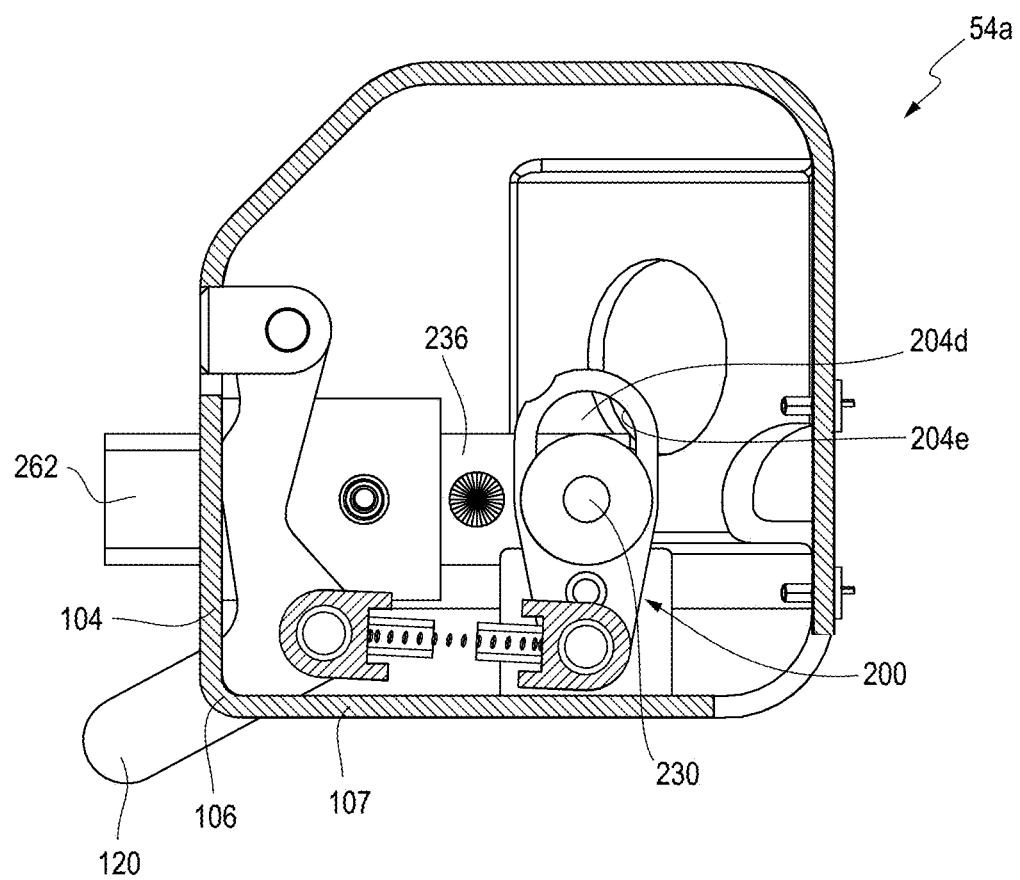
FIG. 11 is a sectional view taken generally along the lines 11-11 of FIG. 7.

Referring also to FIGS. 7, 8 and 11, movement of the second portion 156 in the direction of the arrow 272 causes the second link assembly 200 to rotate about the pin 222 in a counterclockwise direction (as seen in FIG. 11). Such rotation initially causes the bearings 238 and 240 seen in FIGS. 9 and 10 to move down in the elongate slots 202d, 204d and the bearings 244 to move to the left in the slot 251 as illustrated in FIG. 7. The bearings 238, 240 eventually move upwardly in the slots 202d, 204d, respectively, as the bearings 244 continue to move to the left in the slot 251. The latch 236 and locking member 262 are carried by the second link assembly 200, if not blocked or prevented by movement as noted above. Eventually, the locking member 262 moves to a fully extended position through the opening 84a into the casting 70a when the container 52 is fully seated on the chassis 50. The shapes and sizes of the surfaces 202e, 204e, and 250 defining the slots 202d, 204d, and 251, respectively, and the diameters of the outer races of the bearings 238, 240, and 244 are selected to ensure smooth operation of the retention device 54a.

Figure 18:
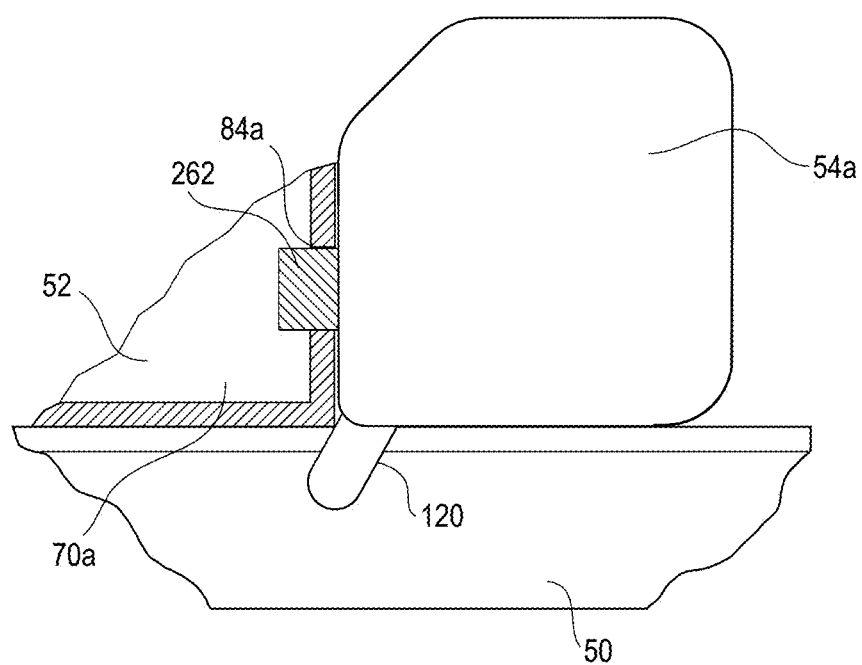
FIG. 18 is a simplified fragmentary sectional view, taken generally long the lines 18-18 of FIG. 2, of the container latched to the chassis by the container retention device.

A seen in FIG. 18, the relative sizes of the locking member 262 and the opening 84a and the space inside the casting 70a results in secure retention of the respective corner of the container 52 on the chassis 50. Referring again to FIGS. 4-10 at such time, the actuation mechanism 260 may be automatically or selectively operated to move the plunger 261 into the bore 254. In one embodiment, the actuation mechanism 260 is spring-loaded so that when the bore 254 moves into alignment with the plunger 261, the actuation mechanism 260 automatically moves the plunger 261 under spring force into the bore 254.

In another embodiment, the actuation mechanism 260 is operated by a fluid system, such as one or more portions of an air brake system used in a conventional transport vehicle that transports a container as described hereinafter, to extend the plunger 261 into the bore 254, and thereby lock at least the front of the container 52 to the chassis 50 until released as noted below. As is known, an air brake system typically includes a front brake air system (service brakes) and a rear brake air system (service, parking, and emergency brakes).

Figure 19:
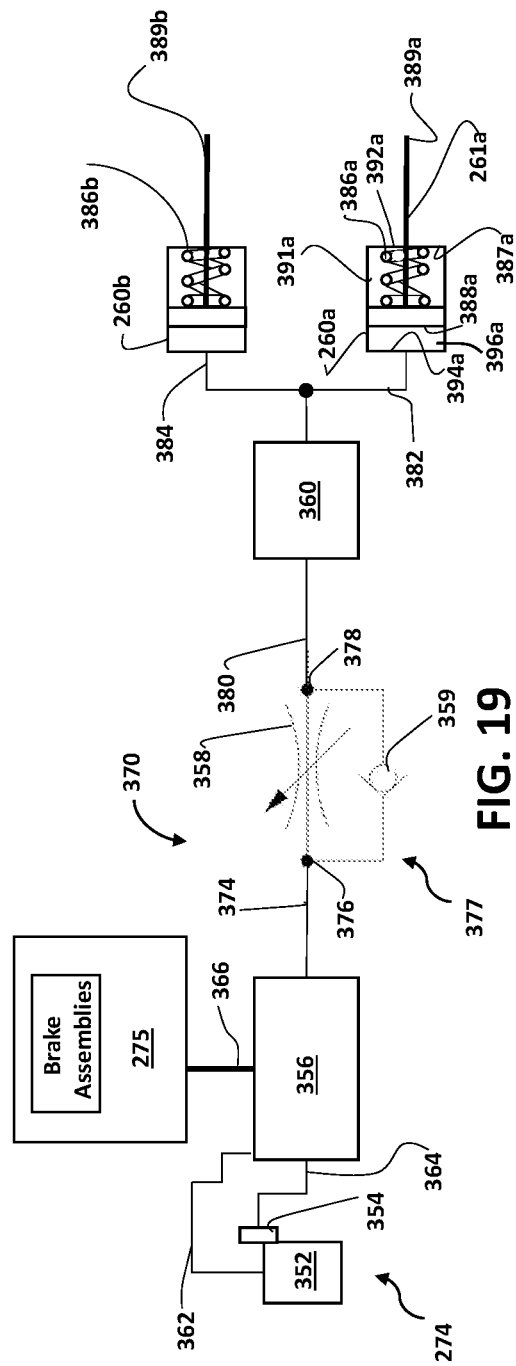
FIG. 19. is a simplified schematic illustration of the exemplary brake system.

Specifically, referring to FIG. 19, a portion of the brake system 274 comprises a compressor 352, a governor 354, and a first fluid reservoir 356, such as a tractor primary or other reservoir alone or a combination of such reservoirs. A container locking system 370 comprises a pressure-compensated flow control valve 377, a second fluid reservoir 360, such as a trailer air reservoir, and actuation mechanisms 260a, 260b of the driver side front container retention device 54a and passenger side front container retention device 54b, respectively.

In the illustrated embodiment, when the vehicle engine is running, air is compressed by the compressor 352 and transferred to the first fluid reservoir 356 through a discharge line 362. The governor 354 controls the magnitude of fluid pressure in the first fluid reservoir 356 between cut-in and cut-out levels of about 100 psi and about 125 psi, for example. Compressed air from the first fluid reservoir 356 is transferred to a foot valve (not shown) through a supply line 366 and to the service brake system 275 comprising associated brake assemblies. Compressed air is also transferred through a second supply line 374 to an inlet 376 of the flow control valve 377. The flow control valve 377 comprises a parallel combination of a variable orifice 358 and a check valve 359. It may be noted that the variable orifice 358 may be replaced by a fixed orifice, if desired. The flow control valve 377 further includes an outlet 378 coupled to the second fluid reservoir 360 via a third supply line 380. In an alternative embodiment, the outlet 378 may be coupled to the second fluid reservoir 360 directly, such as by a a male/female stud coupling. As noted in greater detail hereinafter, if the primary reservoir 356 has lost pressurization, the flow control valve 377 is operable to maintain at least a selected magnitude of fluid pressure in the second fluid reservoir 360 for a duration of about 30 seconds, for example. Furthermore, in a particular embodiment, the cracking pressure, or the minimum pressure differential needed between the inlet 376 and outlet 378 for fluid to flow through the check valve 359 is about 1 psi to about 3 psi, for example. In an embodiment, the second fluid reservoir 360 may include a pressure sensor and control apparatus (not shown) similar to the governor 354, wherein the cut out level is 125 psi, and the cut in level is 85 psi. If the second fluid reservoir includes such a sensor, the operator of the vehicle may be alerted when the fluid pressure inside the second fluid reservoir 360 has dropped to a certain level, such as about 60 psi or less. In such a case, the loss of fluid pressure is signaled to warn the operator of an imminent potential failure of the container locking system 370.

Furthermore, the second fluid reservoir 360 is coupled to the actuation mechanism 260a of the driver side front container retention device 54a via a fourth supply line 382 and to the actuation mechanism 260b of the passenger side front container retention device 54b via a fifth supply line 384. Because the actuation mechanism 260a of the driver side front container retention device 54a and the actuation mechanism 260b of the passenger side front container retention device 54b are mirror images of one another, but are preferably otherwise identical, only the portion of the brake system 274 coupled to the actuation mechanism 260a of the driver side front container retention device 54a will be described in detail herein, it being understood that actuation mechanism 260b of the retention device 54b operates identically.

As shown in FIG. 19, the actuation mechanism 260a of the driver side front container retention device 54a comprises a fluidic (e.g., pneumatic) piston and cylinder device including an actuation plunger 261a comprising a piston 388a coupled to a piston rod 389a, and a biasing compression spring 386a disposed in a cylinder 391a. The biasing spring 386a is disposed in compression between an end surface 387a of a first cylinder head 392a and the piston 388a and surrounds the piston rod 389a. The piston rod 389a extends outwardly through the cylinder head 392a and is capable of left-right movement as seen in FIG. 19. A second cylinder head 394a is spaced from the first cylinder head 392a and defines a space 396a for receipt of pressurized air via the supply line 382. Fluid pressure, such as pressurized air, may be transferred from the second fluid reservoir 360 to the space 396a.

When the fluid pressure in the space 396a develops a force that exceeds the biasing force of the spring 386a, the piston 388a and piston rod 389a move outwardly to an extended or locked position (i.e., to the right as seen in FIG. 19), and, in one embodiment, assuming the container 52 is disposed on the chassis 50, an end of the piston rod 389a moves one or more separate rod(s), plunger(s), or other element(s), such as the above-described plunger 261a connected to the end into the bore 254a. In an alternate embodiment, the end of the piston rod 389a directly extends into the bore 254a of the latch 236a without any intervening elements therebetween.

Figure 20:
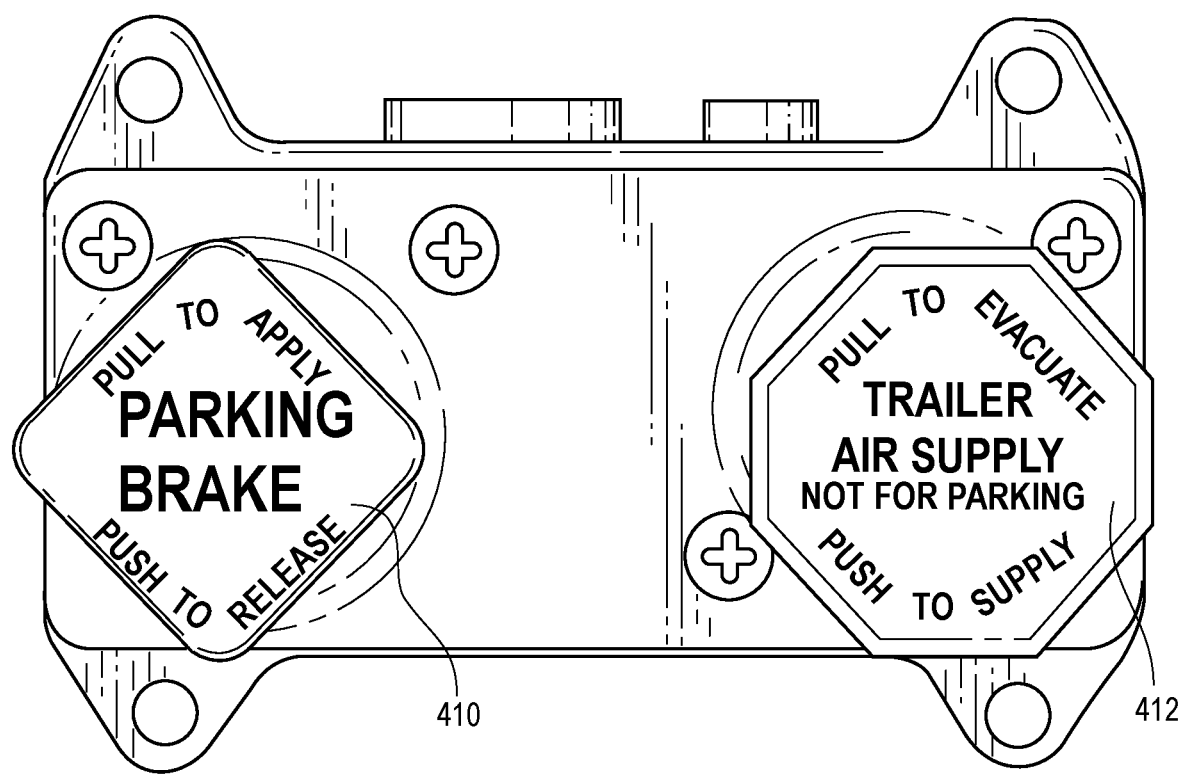
FIG. 20 is an elevational view of brake controls that control air supply to various braking components.

FIG. 20 illustrates first and second brake controls 410 and 412, respectively. The brake controls are typically located in the tractor cab to facilitate easy access thereto by the vehicle operator or other personnel. The brake controls may alternatively be at another location, such as on the chassis 50. The first control 410 comprises a parking brake control. An operator or other personnel may pull the control 410 to an outer position to exhaust the pressurized air in the first fluid reservoir 356, thereby causing the brake assemblies to apply braking forces to some or all of the wheels of the tractor/trailer system. Pushing the control 410 to an inner position causes pressurized air to be directed into the first fluid reservoir 356 (provided the available air pressure is above a certain level), thereby releasing the braking forces to some or all of the wheels of the tractor/trailer system.

Similarly, pulling the second brake control 412 to an outer position results in the application of braking forces in an emergency braking mode to some or all of the wheels of the trailer system. On the other hand, pushing the second brake control 412 in when there is sufficient pressure in the first fluid reservoir 356 releases the braking forces on some or all of the wheels of the trailer system.

A method of operating the above-described components to secure/remove a container 52 to/from the chassis 50 (trailer) of a tractor/trailer vehicle comprises the following steps under the assumptions that the chassis 50 is initially empty, the chassis 50 (sometimes referred as the trailer) is not coupled to the tractor, and the second (i.e., trailer) reservoir is depressurized. Upon arrival of the tractor at a desired loading location, the tractor is mechanically coupled to the chassis 50. The operator or other personnel may then pull the brake control 412, in turn causing air is to be exhausted from the first fluid reservoir 356 and initiating the emergency braking mode. The chassis 50 is then coupled to the tractor via glad hands (not shown). Since no fluid pressure is available to transfer from the first fluid reservoir to the second fluid reservoir and ultimately to the spaces 396 in the actuation mechanism 260 of both the driver side front container retention device 54a and the passenger side front container retention device 54b, the actuation plungers 261 are in a retracted state (i.e., not extended). Next, when the container 52 is lowered and/or placed on the chassis 50, the actuators 120 are moved to the retracted position so that the locking members 262 extend outwardly and move into the castings 70. The relative sizes of the locking members 262, the openings 84, and the spaces inside the castings 70 result in secure retention of the corners of the container 52 on the chassis 50. After the locking members 262 extend into the corner castings 70, the operator or other personnel may push the second brake control 412. Pressurized air released into the first reservoir 356 causes the braking system to transition out of the emergency braking mode and the pressurized air is transferred from the first fluid reservoir 356 though the check valve 359 into the second reservoir 360. Pressurization of the secondary reservoir 360 causes the piston rod 389a of the actuation mechanism 260a and a corresponding piston rod 389b of the actuation mechanism 260b to move to the extended positions into the bores 254. The pressure in the secondary reservoir 360 maintains the piston rods 389 in the extended positions so that the front corners of the container 52 are locked to the chassis 50 and cannot be disengaged from the container retention device 54 nor can the container 52 be lifted from the chassis 50 until the forces developed by the fluid pressures in the spaces 396 no longer exceed the biasing forces of the springs 386a, 386b.

To remove the container 52 from the chassis 50, an operator brakes to a stop and, while the tractor/trailer is not moving, the emergency braking mode is activated by pulling the second control 412. Pressurized air is exhausted from the primary reservoir 356, applying braking forces to the tractor/trailer braking system. A pressure differential is created between the secondary reservoir 360 and the primary reservoir 356 causing air to be metered through the variable orifice 358, wherein the secondary reservoir 360 eventually depressurizes to a level insufficient to result in forces that are able to resist the forces of the spring 386a in the actuation mechanism 260a and a corresponding spring 386b in the actuation mechanism 260b. As noted above, this depressurization level may be reached at a selected delay time, such as 30 seconds following pulling of the control 412. At such time the piston rods 389a and 389b move to a retracted position such that the plungers 261 (or the ends of the piston rods 389, as the case may be) are spaced from the the latch 236 and locking member 262 ensuring that the actuators 120 are able to move to the extended positions outside of the housings 100. Upon deactuation of the container retention devices (and any devices restraining other portion(s) of the container 52), the container 52 may then be removed from the chassis 50.

Similarly, if there is a loss in fluid pressure in the first fluid reservoir 356 while the tractor engine is running and the tractor/trailer is moving, the flow control valve 377 continues for the selected delay time to provide enough pressure to the second fluid reservoir 360 to keep the piston rods 389a, 389b in the extended position so that the container 52 remains locked on the chassis 50 for the selected delay time. The loss of air pressure in the reservoir 356 is typically indicated by an alarm, which, when actuated, indicates that the driver should stop the vehicle at the earliest possible time. The selected delay time that the container 52 remains locked on the chassis 50 is preferably sufficient to allow the driver to safely pull over, but not so long to hinder unloading of the container 52 from the chassis 50 after the tractor/trailer is stopped.

The rear castings 72a, 72b may be locked to the chassis 50 by the container retention devices 64a, 64b, which may be of the type disclosed in co-owned U.S. Pat. Nos. 9,387,792, 9,463,732, 9,802,526, and/or 9,340,146 incorporated by reference herein. Alternatively, rear container retention devices comprising actuation mechanisms could be used to secure the rear corners of the container 52 to the chassis 50 that are identical or similar to the front container retention devices 54a, 54b with the exception that the rear retention devices include forwardly extending latches and locking members, as opposed to the rearwardly extending latches and locking members of the retention devices 54a, 54b.

As should be evident, if the vehicle engine has not been running and the second fluid reservoir 360 has depressurized, no fluid pressure is available for transfer to the spaces 396 in the actuation mechanisms 260 and the container 52 is unlocked, and, upon deactuation of the container retention devices, the container 52 may then be removed from the chassis 50.

In an alternative embodiment, actuation of the parking brakes using the control 410 may likewise cause ultimate depressurization of the reservoir 360, leading to unlocking of the container 52.

As described above, the fluid in the system may be air, or may be any other fluidic substance.

In summary, the container 52 by may be selectively released from the retention devices 54a, 54b (and remaining retention devices) by operating the actuation mechanisms 260 to retract the plungers 261 (or other structures) from the bores 254. As should be evident from the foregoing, such operation may be undertaken automatically when a condition arises, such as when emergency or parking braking modes are activated, or when pressure is otherwise lost in the second reservoir 356. When using front container retention devices 54, the container 52 may be lifted upwardly, causing retraction of the latches 236/locking members 262 from each of the front castings 70a, 70b, under the influence of the return springs 216 of the retention devices 54 so that the container 52 is released from the retention devices 54. Likewise, if rear container retention devices similar to the front retention devices 54 are used, upward movement of the container 52 causes retraction of the latches 236/locking members 262 from each of the rear castings 72a, 72b under the influence of the return springs of the rear retention devices so that the container 52 is released from the rear retention devices.

In alternative embodiments, locking and/or unlocking of the container 52 to/from the chassis 50 may be undertaken manually by applying to or exhausting a pressurized fluid in a manner other than as described above from the appropriate sides of the pistons of the mechanisms 260. Alternatively, electric power may be supplied to or removed from the mechanism 260 when a solenoid is used as the mechanism 260 or when a solenoid is used to activate/deactivate one or more valves that pressurize/depressurize appropriate sides of the pistons of the mechanisms 260. Still further, a handle (not shown) may be used to extend and/or retract the plungers 261 whether a spring force is or is not applied to the plungers 261, etc.

In each embodiment the retention devices 54 and the brake system 274 are preferably failsafe in nature such that, if there is a loss of fluid pressurization or electrical power that occurs while the chassis 50 is in motion the retention devices 54 maintain the locking member 262 and the plunger 261 in the extended positions to maintain securement of the container 52 to the container chassis 50 for at least a limited amount of time as noted above.

INDUSTRIAL APPLICABILITY

As described above, the container retention devices 54 utilize one or more elements of the brake system 274 to secure the container 52 to the vehicle, more specifically to the chassis 50 of the vehicle, once the container 52 is placed on the chassis 50. The container 52 remains secured to the chassis 50 until selectively released. In the preferred embodiment, the container 52 is locked to the chassis 50 until a predetermined time after the vehicle has come to a stop, and/or the emergency or parking brakes have been engaged.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A system for a vehicle having a brake system, comprising:
   a retention device adapted to engage and secure a container to the vehicle responsive to operation of the brake system wherein the retention device comprises;
   an actuation mechanism;
   a first fluid reservoir;
   an orifice flow control device coupled to the first fluid reservoir via a first supply line; and
   a second fluid reservoir coupled to the orifice flow control device via a second supply line and to the actuation mechanism via a third supply line.

2. The system of claim 1, wherein the retention device further comprises:
   a housing;
   an actuator; and
   a latch;
   wherein the actuation mechanism comprises a plunger and a spring.

3. The system of claim 2, wherein the latch of the retention device is adapted to expand outwardly in engagement with an orifice of the container, and wherein the plunger of the actuation mechanism is adapted to extend outwardly in engagement with the latch of the retention device.

4. The system of claim 2, wherein the first fluid reservoir has a first fluid pressure, the second fluid reservoir has a second fluid pressure, and the actuation mechanism has a third fluid pressure.

5. The system of claim 1, wherein the orifice flow control device is a pressure-compensated flow control valve.

6. The system of claim 5, wherein the orifice flow control device maintains a fluid pressure sufficient to provide a duration of about 30 seconds of fluid pressure to the second fluid reservoir.

7. A system for a vehicle having a brake system, comprising:
 a retention device adapted to engage and secure a container to the vehicle responsive to operation of the brake system;
 wherein the retention device comprises:
  a housing;
  an actuator;
  a latch;
  a linkage device having a first link and a second link; and
  an actuation mechanism comprising a plunger and a spring; and
 wherein the brake system comprises:
  a first fluid reservoir with a first fluid pressure;
  an orifice flow control device coupled to the first fluid reservoir via a first supply line; and
  a second fluid reservoir with a second fluid pressure coupled to the orifice via a second supply line and to the actuation mechanism via a third supply line.

8. The system of claim 7, wherein the actuator is coupled with the first link of the linkage device and is adapted to depress in engagement with the container, the latch is coupled with the second link of the linkage device and is adapted to extend outwardly in engagement with an orifice of the container, and wherein the plunger is adapted to extend outwardly in engagement with the latch of the retention device.

9. The system of claim 8, wherein the actuation mechanism further comprises a third fluid pressure.

10. The system of claim 7, wherein the first fluid pressure is from 100 psi to 125 psi.

11. The system of claim 7, wherein the second fluid pressure is from 85 psi to 125 psi.

12. The system of claim 9, wherein the third fluid pressure is from 70 psi to 100 psi.

13. The system of claim 7, wherein the orifice flow control device is a pressure-compensated flow control valve.

14. The system of claim 13, wherein the pressure-compensated flow control valve maintains a pressure sufficient to provide a duration of about 30 seconds of fluid pressure to the second fluid reservoir.

15. A method undertaken by a vehicle having a brake system, comprising:
 coupling a retention device adapted to engage and secure a container to the vehicle responsive to operation of the brake system, wherein the retention device comprises:
  a housing;
  an actuator;
  a latch; and
  an actuation mechanism comprising a plunger and spring;
 coupling the brake system to the actuation mechanism, the brake system comprising:
  a first fluid reservoir;
  an orifice flow control device coupled to the first fluid reservoir via a first supply line; and
  a second fluid reservoir coupled to the orifice via a second supply line and to the actuation mechanism via a third supply line;
 engaging the actuator of the retention device, wherein engaging the actuator extends the latch into an orifice of the container, and wherein the plunger of the actuation mechanism is extended into the latch of the container retention device.

16. The method of claim 15, wherein the first fluid reservoir has a first fluid pressure, the second fluid reservoir has a second fluid pressure, and the actuation mechanism has a third fluid pressure.

17. The method of claim 15, wherein the orifice is an orifice of a pressure-compensated flow control valve, wherein the pressure-compensated flow control valve maintains a pressure sufficient to provide a duration of about 30 seconds of fluid pressure to the second fluid reservoir.

\* \* \* \* \*